United States Patent [19]

Hoppie et al.

[11] Patent Number: 4,908,553
[45] Date of Patent: Mar. 13, 1990

[54] MAGNETIC REGENERATIVE BRAKING SYSTEM

[75] Inventors: Lyle O. Hoppie, West Bloomfield; Donald Speranza, Portage, both of Mich.

[73] Assignee: Eaton Corporation, Cleveland, Ohio

[21] Appl. No.: 286,992

[22] Filed: Dec. 20, 1988

[51] Int. Cl.$^4$ .............................................. H02P 3/00
[52] U.S. Cl. .................................... 318/382; 318/370; 318/376
[58] Field of Search ............... 318/370, 375, 376, 377, 318/378, 379, 380, 381, 382

[56] References Cited

U.S. PATENT DOCUMENTS

| | | | |
|---|---|---|---|
| 3,110,462 | 11/1963 | Abendroth et al. | 318/382 X |
| 4,132,934 | 1/1979 | Morton et al. | 318/382 |
| 4,216,420 | 8/1980 | Jinbo et al. | 318/376 X |
| 4,453,114 | 6/1984 | Nordlund | 318/376 |
| 4,471,277 | 9/1984 | Franz, Jr. | 318/376 |
| 4,733,146 | 3/1988 | Hamby | 318/376 X |

Primary Examiner—Bentsu Ro
Attorney, Agent, or Firm—Krass & Young

[57] ABSTRACT

The present invention is a regenerative braking system useful in systems having variable kinetic energy such as vehicles. A DC machine having an independently energized field coil includes a rotor mechanically coupled for rotation at a speed proportional to the velocity of the load. During deceleration the armature is coupled to an inductor and rotational energy provided by the load is converted into magnetic energy stored in the magnetic field of the inductor. To store the energy a short is connected across the inductor, which is preferably operating under superconducting conditions. For acceleration this inductor current is applied to the DC machine to produce a torque for moving the load. The phase reversal required for proper direction of torque is preferably achieved by reversing the direction of field current. The rate of energy transfer and thus the rate of acceleration or deceleration is controlled by controlling the magnitude of the field coil current. A preferred embodiment includes a vehicle battery and motor control for powering the DC machine as the prime mover of the system. A control circuit responsive to vehicle speed, accelerator pedal position, brake pedal position, and the amount of current in the inductor controls switches for proper transfer of energy.

10 Claims, 2 Drawing Sheets

MAGNETIC REGENERATIVE BRAKING SYSTEM

TECHNICAL FIELD OF THE INVENTION

The technical field of the present invention is that of regenerative braking devices employed to store and reuse the kinetic energy of a mass of variable kinetic energy such as a vehicle.

BACKGROUND OF THE INVENTION

Regenerative braking systems are employed for energy savings. Many mechanical systems operate with variable kinetic energy with repeated start/stop cycles. A common example of such a system is a motor vehicle in stop and go city traffic. Other vehicular examples include garbage trucks and warehouse lift trucks. These systems are not limited to vehicles but include industrial processes as well. A simple example is the start/stop operation of high speed thread bobbin winders. The common feature of such applications is that the energy expended in accelerating to a "cruise speed" is comparable to that used to maintain the "cruise speed" for the cruise duration. Typically the deceleration process employs a mechanical brake. Thus much of the energy consumed in the system is dissipated in brake heating. Regenerative braking systems are proposed to capture and store some of the vehicular kinetic energy typically dissipated during braking. Regenerative braking systems then employ some of this stored energy in the next acceleration cycle.

The major problem with prior regenerative braking systems is the efficiency of energy storage and conversion, and control of the energy transfer process. Prior proposed regenerative braking systems have included: electrical systems which include a motor/generator and a chemical battery; flywheel systems; hydrostatic systems employing compressed air; and mechanical strain systems employing steel or elastomeric springs. These systems suffer from disadvantages which preclude their widespread use.

The prior electrical systems suffer from a limited capacity to absorb and deliver energy. In such systems much energy is lost during braking because chemical batteries of reasonable size cannot absorb energy at the rate generally required during deceleration, particularly for vehicles. Further, the same battery typically cannot deliver energy efficiently at the rate required by the system during acceleration.

Flywheel systems present difficult control problems. This is because the rate of change of speed of the flywheel must be opposite that of the mass itself. Thus, for example, when the vehicle is decelerating the flywheel must be rotated faster to store more energy. Likewise, when the vehicle is to accelerate the flywheel must be slowed to deliver energy. This leads to a requirement for a complex wide range variable ratio transmission. In addition, gyroscopic effects prevent use of this technique is some vehicles.

Hydrostatic systems provide energy storage in compressed air. The round trip efficiency of the required pump for energy storage and pneumatic motor for energy delivery are of the same order as flywheel systems. Such systems can be relatively compact. They are disadvantageous in that they require moderately complex control systems, though of a lesser degree than flywheel systems. Much energy is lost in heat in such systems.

Strain systems employing either steel or elastomeric springs have an advantage in that they form naturally oscillating systems. A mass on a spring has a natural tendency to exchange kinetic energy for potential energy and vice versa. Thus no complex energy conversion machinery is required because the system naturally exchanges energy in the manner desired. One problem with such a naturally oscillating system is that it has its own inherent energy exchange rate which can only be changed by changing either the mass or the effective spring constant of the system. Thus energy exchanges at widely differing rates is difficult with such systems.

There is a need in the art of regenerative braking systems for a system with a high round trip efficiency, which requires a minimum of controls and which permits variable energy transfer rates.

SUMMARY OF THE INVENTION

The present invention is a regenerative braking system useful in systems having variable kinetic energy such as vehicles. A DC machine having an independently energized field coil includes a rotor mechanically coupled for rotation at a rotation rate proportional to the speed of the load. During deceleration the armature is coupled to an inductor and rotational energy provided by the load is converted into magnetic energy stored in the magnetic field of the inductor. To store the energy, an electrical short is connected across the inductor, which is preferably operating under superconducting conditions. For acceleration this inductor current is applied to the DC machine to produce a torque for moving the load. The phase reversal required for proper direction of torque is preferably achieved by reversing the direction of field current.

The DC machine under varying rotational speeds behaves electrically like a capacitor. This forms an equivalent LC circuit. The exchange of energy between the kinetic energy of the load and the magnetic energy of the inductor thus requires no special energy conversion apparatus because this is a naturally oscillating system which freely exchanges energy in the manner desired. The rate of energy transfer and thus the rate of acceleration or deceleration is controlled by controlling the magnitude of the field coil current. The field coil current controls the equivalent capacitance of the DC machine. Thus the time constant of the system is dependent upon the magnitude of the field current.

A preferred embodiment includes a vehicle battery and motor control for powering the DC machine as the prime mover of the system. A control circuit responsive to vehicle speed, accelerator pedal position and brake pedal position controls switches for proper transfer of energy.

BRIEF DESCRIPTION OF THE DRAWINGS

These and other objects and aspects of the present invention will become clear from the foregoing description taken in conjunction with the drawings, in which.

DETAILED DESCRIPTION OF THE PREFERRED EMBODIMENT

Figure 1A:
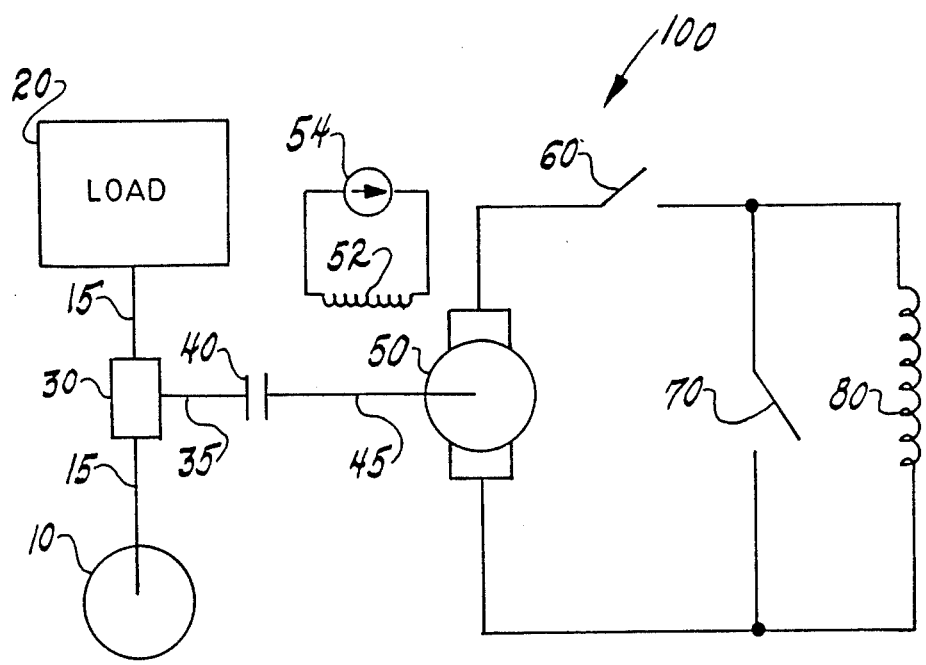
FIGS. 1a and 1b illustrate the present invention in conceptual form.
Figure 1B:
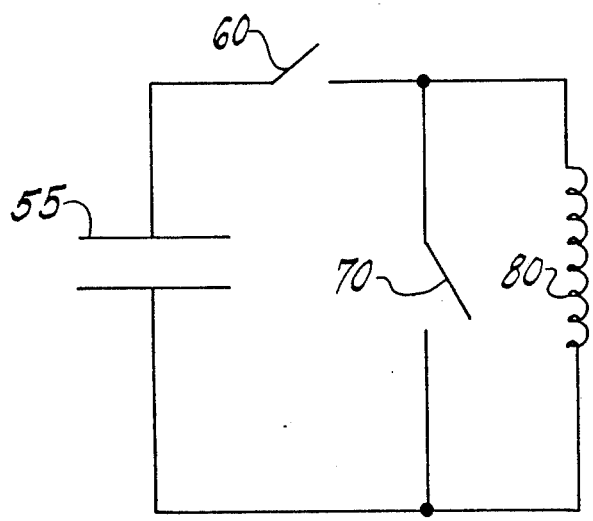

FIGS. 1a and 1b illustrate the present invention in conceptual form. FIG. 1a illustrates the actual system, while FIG. 1b illustrates the equivalent electrical system.

Regenerative braking system 100 is employed with prime mover 10 and load 20. Prime mover 10 is the primary source of energy in the system. Prime mover 10 could be an electric motor or an internal combustion engine. Prime mover 10 is coupled to load 20 via shaft 15. A coupling 30 attached to shaft 15 enables the regenerative braking system 100 to exchange energy with the load 20. Coupling 30 is connected via a shaft 35 to a clutch 40. Clutch 40 permits decoupling of regenerative braking system 100 during cruising to decrease energy loss.

The energy transfer takes place in a DC machine 50. Shaft 45 couples clutch 40 to the mechanical input/output shaft of DC machine 50. DC machine 50 has a separately excited field coil 52. FIG. 1a shows field coil 52 coupled to a current source 54. The armature coil terminals of DC machine 50 are connected to switches 60 and 70 and inductor 80. DC machine 50 and inductor 80 form an LC circuit in a manner that will be detailed below.

The electrical character of DC machine 50 approximates a capacitor under shaft speed transient conditions. The equations of motion of DC machine 50 are as follows:

$$v = K i_f w \qquad (1)$$

$$I \frac{dw}{dt} = K i_f i \qquad (2)$$

where: v is the armature voltage; i is the armature current, I is the total moment of inertia of the complete vehicle reflected to shaft 45; w is the angular speed of the shaft; K is a machine constant; and $i_f$ is the field coil current. If we assume that the field coil current $i_f$ is constant, then from equation (1):

$$\frac{dw}{dt} = \frac{1}{K i_f} \frac{dv}{dt} \qquad (3)$$

Substituting this expression for dw/dt into equation (2) yields:

$$i = \frac{I}{(K i_f)^2} \frac{dv}{dt} = C \frac{dv}{dt} \qquad (4)$$

Equation (4) can be understood as the electrical equation for a capacitance of value $I / (K i_f)^2$. Thus the system of DC machine 50 and inductor 80 form an LC circuit. The equivalent electrical circuit is illustrated in FIG. 1b. This combination of the DC machine 50 and inductor 80 thus forms a naturally oscillating system which freely exchanges energy in both directions. This is helpful because this exchange of energy is the goal of the regenerative braking process.

The regenerative braking process operates as follows. When braking from the cruise speed is desired, clutch 40 is engaged while switches 60 and 70 are open. DC machine 50 is unloaded and thus quickly spins up to the speed of shaft 35, which is determined by the speed of shaft 15 and thus the velocity of load 20. DC machine 50 produces the voltage indicated by equation (1). Next switch 60 is closed (and switch 70 is opened if it was previously closed) to apply this voltage to inductor 80. For the moment assume that inductor 80 carries no current. As seen from FIG. 1b, this is equivalent to application of a charged capacitor 55 across inductor 80 causing a current to flow. This simultaneously loads down shaft 35 causing the speed of load 30 to be reduced. The current through inductor 80 increases as the voltage of DC machine 50 decreases due to the slowing of load 20. This serves to exchange energy from the kinetic energy of load 20 into the magnetic energy $E_{mag}$ of the current through inductor 80 ($E_{mag} = 1/2 \, L \, i^2$). This is exactly the energy exchange required in regenerative braking.

Switches 60 and 70 are operated to capture this energy within inductor 80. When the kinetic energy of load 20 is reduced to zero, w is also zero. Thus the voltage v across DC machine 50 is zero. This corresponds to the case of maximum current i through inductor 80. At this time switch 70 is first closed and switch 60 is then opened. The current within inductor 80 is thus captured in the electrical path through switch 70. There would be significant losses in such an arrangement due to the resistance within inductor 80, switch 70 and the associated wiring if conventional conductive materials were used. Such losses can be substantially eliminated by forming inductor 80, switch 70 and the associated wiring of material capable of superconduction and cooling these parts to a temperature that supports superconduction.

The acceleration process is the reverse of the deceleration process. Energy is stored in the magnetic field created by the current flowing though inductor 80. Switch 60 is first closed and switch 70 is then opened to apply this current to DC machine 50. Note that this direction of current will tend to turn DC machine 50 in a reverse direction. The direction of operation of DC machine 50 must be reversed for acceleration. This can be achieved by reversing the polarity of the armature coil connection via a double pole double throw switch. In the preferred embodiment this reversal of operation is achieved by reversing the direction of the field current $i_f$. Current from inductor 80 applied to DC machine 50 starts rotation of shaft 45. This shaft rotation is applied to shaft 35 via clutch 40 and hence to shaft 15 via coupling 30. This provides a torque for acceleration of load 20. If desired, the acceleration can be supplemented by prime mover 10.

When DC machine 50 begins to turn, it begins to produce a voltage in accordance with equation (1). This voltage is equivalent to the voltage built up on capacitor 55 in the electrical equivalent circuit illustrated in FIG. 1b. As the kinetic energy of load 20 is increased, the angular velocity w increases and the voltage across the armature coil of DC machine 50 likewise increases. When the current through inductor 80 is reduced to zero, indicating the transfer of all the magnetic energy previously stored in inductor 80, the prime mover 10 is engaged and switch 60 is opened. The clutch 40 may be disengaged at the same time. This serves to eliminate any loading upon shaft 15 via coupling 30 when no more energy can be withdrawn from regenerative braking system. The cycle of recapture, storage and use of energy is thus complete.

The regenerative braking system of the present invention provides a manner for control of the rate of energy transfer. Note that the time constant T of this energy exchange (in either direction) is:

$$\frac{1}{LC} = \frac{(K i_f)^2}{IL} = \left(\frac{2\pi}{T}\right)^2 \qquad (5)$$

This time constant comes from the well known time constant of the equivalent electrical circuit. This time constant of energy exchange is inversely proportional to a controllable quantity, the field current $i_f$. Thus the field current $i_f$ can be controlled to provide a desired rate of deceleration or acceleration. Note that any practical system will include an auxiliary mechanical brake. This mechanical brake can provide additional braking if the desired rate of deceleration is greater than the capabilities of regenerative braking system 100 or to act as the primary brake when the load is stopped. This mechanical brake also serves as a back in case of a failure within regenerative braking system 100.

Figure 2:
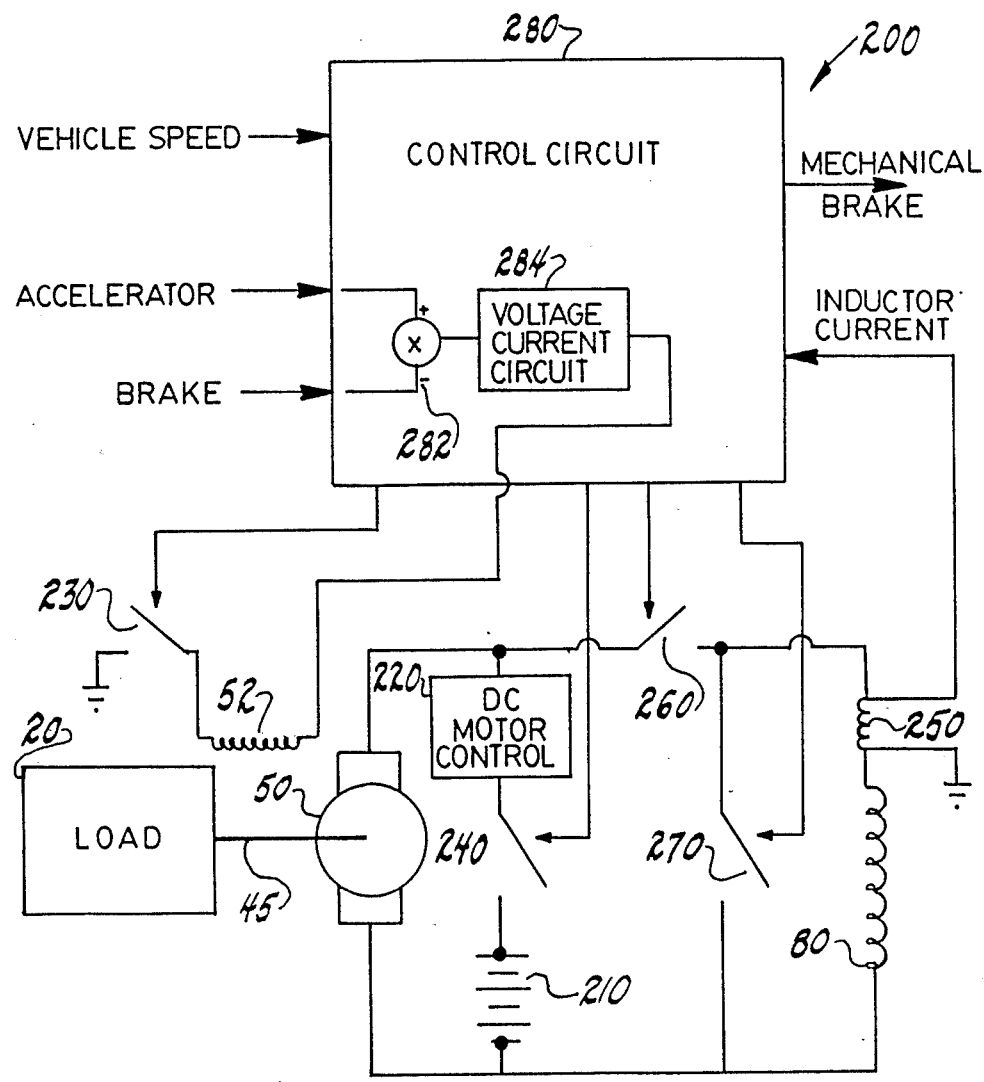
FIG. 2 illustrates a preferred embodiment of the present invention.

FIG. 2 illustrates a practical embodiment of the present invention specifically for an electric vehicle 200. The prime mover of vehicle 200 illustrated in FIG. 2 is DC machine 50 as powered by vehicle battery 210. When operating under battery power, controlled switch 240 is closed. This supplies electric power to DC chopper 220. DC chopper 220 provides the duty cycle of DC electric power to DC machine 50 to produce a vehicle speed proportional to an accelerator pedal position command signal by any means known to those skilled in the art. The switches 60 and 70 of FIG. 1 are replaced in FIG. 2 by controlled switches 260 and 270, respectively. Also included in FIG. 2 are controlled switches 230 and 240. These controlled switches could be relays or any of the known types of semiconductor switches, such as thyristors, and bipolar or field effect transistors. This arrangement uses DC machine 50 as both the prime mover and the regenerative braking energy transducer, thereby eliminating the need for coupling 30 and clutch 40.

In the preferred embodiment, a control circuit 280 receives inputs based upon the vehicle state and controls operation of the regenerative braking system. Control circuit 280 receives four analog signals a vehicle speed signal; an accelerator pedal position command signal; a brake pedal position command signal; and an inductor current signal. The vehicle speed signal is a voltage proportional to the vehicle speed. This can be produced using a frequency modulated speed transducer and a frequency to voltage converter in a manner known in the art. The accelerator and brake pedal position signals can be produced by potentiometers which are rotated in accordance with the pedal position. The inductor current signal is produced by a current sensor 250 which detects the current flowing through inductor Control circuit 280 generates a plurality of outputs for control of vehicle 200. Control circuit 280 generates switch drive signals to control controlled switches 230, 240, 260 and 270. Control circuit 280 also generates a control signal for a mechanical brake. In the preferred embodiment, control circuit 280 controls the magnitude and direction of current through field coil 52 as follows. The analog accelerator pedal position command signal is summed with the analog brake pedal position command signal (which is a negative signal) in an analog summer 282. This analog signal is the demand the operator makes on the vehicle drive. This signal is positive for acceleration demand, zero for a coasting demand and negative for braking demand. This demand signal is applied to the input of a voltage to current converter 284 which produces a current proportional to the voltage input. The output of this voltage to current converter 284 is applied to the field coil 52. Because the demand signal can be negative due to a demand for braking, the voltage to current converter 284 must be able to sink or source current depending on the input voltage. Thus the field coil current is proportional to the acceleration/brake demand. Note that this arrangement automatically provides reversal of DC machine 50 operation between energy accumulation and energy release based upon the direction of current through field coil 52. Also note that this control of the field current automatically matches the time constant and rate of the energy transfer to the operator's demand detected via the accelerator pedal and brake pedal.

The manner in which control circuit 280 controls switches 230, 240, 260 and 270 depends upon the control strategy selected. The following logical description of a control strategy is included as an example of a control strategy that could be employed when inductor 80 is constructed of superconducting materials.

It is well known that the current in superconducting material must not exceed a value which is dependent upon the size, shape and type of superconducting material employed in order to remain in superconducting condition. The control strategy of the present example enables control circuit 280 to prevent the inductor current from exceeding this maximum superconducting current $I_{max}$.

The control strategy is detailed in Table 1. Table 1 lists the open and close conditions for switches 230, 240, 260 and 270 as well as the on and off conditions for the mechanical brake based upon specified input conditions. It should be understood that the demand signal is formed by the analog subtraction of the brake pedal position command signal from the accelerator pedal position command signal as discussed above. In addition, it should be understood that the field coil 52 is driven with a current proportional to the demand signal.

TABLE 1

| Demand Signal | Vehicle Speed | Inductor Current | Switch 230 | Switch 240 | Switch 260 | Switch 270 | Mech. Brake |
|---|---|---|---|---|---|---|---|
| decelerate | not 0 | $< I_{max}$ | close | open | close | open | off |
| decelerate | not 0 | $= I_{max}$ | open | open | open | close | on |
| decelerate | 0 | any value | open | open | open | close | on |
| coasting | any value | any value | open | open | open | close | off |
| accelerate | any value | any value | close | open | close | open | off |
| accelerate | any value | 0 | close | close | open | open | off |

We claim:
1. A regenerative braking system adapted for connection to a load having variable kinetic energy, comprising:
   a DC machine having a rotor mechanically coupled to the load for rotating at a speed proportional to the velocity of the load, an independently energized field coil and an armature coil;
   an inductor; and
   a control circuit connected to said load, said DC machine and said inductor for
   decreasing the velocity of the load by energizing said field coil and connecting said inductor across said armature coil, thereby converting kinetic energy of the load into magnetic energy within said inductor via said DC machine, storing said magnetic energy in said inductor by connecting a short circuit across said inductor, and disconnecting said inductor from across said armature coil, and increasing the velocity of the load by energizing said field coil, switching said DC machine to an opposite polarity and connecting said inductor across said armature coil, thereby converting the magnetic energy of said inductor into kinetic energy of the load via said DC machine.

2. The regenerative braking system as claimed in claim 1, further comprising:
a control demand circuit for generating a control demand signal proportional to the magnitude of a desired rate of change of velocity of the load; and
wherein said control demand circuit is connected to said control circuit and energizes said field coil corresponding to said control demand signal.

3. The regenerative braking system as claimed in claim 1, further comprising:
a phase reversal switch coupled to said armature coil of said DC machine for selectively reversing the polarity of connection of said armature coil; and
wherein said control circuit is connected to said phase reversal switch and switches said DC machine to an opposite polarity by reversing the polarity of connection via said phase reversal switch.

4. The regenerative braking system as claimed in claim 1, wherein:
said control circuit switches said DC machine to an opposite polarity by energizing said field coil of said DC machine in the opposite polarity during acceleration of said load.

5. The regenerative braking system as claimed in claim 1, further comprising:
a first controllable switch connected to said armature coil of said DC machine and said inductor for controllably either connecting said armature coil of said DC machine and said inductor in series or disconnecting said armature coil of said DC machine and said inductor;
a second controllable switch connected in shunt with said inductor for controllably either connecting said short circuit across said inductor or disconnecting said short circuit from said inductor; and
wherein said control circuit
decreases the velocity of the load by controlling said first controllable switch to connect said armature coil of said DC machine and said inductor in series and controlling said second controllable switch to disconnect said short circuit from said inductor,
stores energy in said inductor by controlling said second controllable switch to connect said short circuit said inductor and controlling said first controllable switch to disconnect said armature coil of said DC machine and said inductor, and
increases the velocity of the load by controlling said first controllable switch to connect said armature coil of said DC machine and said inductor in series and controlling said second controllable switch to disconnect said short circuit from said inductor.

6. A regenerative braking system adapted for use in a vehicle having a variable speed of motion comprising:
a DC machine having a rotor mechanically coupled to said vehicle for rotation with vehicle motion, a field coil and an armature coil;
an inductor; and
a control circuit connected to said vehicle, said DC machine and said inductor for
decelerating said vehicle by energizing said field coil in a first polarity and connecting said inductor across said armature coil,
storing energy in said inductor by connecting a short circuit across said inductor, and disconnecting said inductor from said armature coil, and
accelerating said vehicle by energizing said field coil in a second polarity opposite to said first polarity, disconnecting said short circuit across said inductor, and connecting said inductor across said armature coil.

7. The regenerative braking system as claimed in claim 6, further comprising:
an accelerator control for generating an acceleration signal proportional to a desired rate of acceleration of the vehicle;
a brake control for generating a brake signal proportional to a desired rate of deceleration of the vehicle;
a control demand circuit connected to said accelerator control and said brake control for generating a control demand signal proportional to the difference between said acceleration signal and said brake signal; and
wherein said control circuit is connected to said control demand circuit and supplies current to said field coil corresponding to the magnitude and sign of said control demand signal.

8. A vehicle propulsion system comprising:
a vehicle speed sensor for generating a vehicle speed signal proportional to the speed of motion of the vehicle;
a vehicle battery for storing electrical energy;
an accelerator control for generating an acceleration signal proportional to the rate of acceleration of the vehicle;
a brake control for generating a brake signal proportional to a desired rate of deceleration of the vehicle;
a DC machine having a rotor mechanically coupled to said vehicle for rotation with vehicle motion, a field coil and an armature coil;
an inductor;
a current sensor circuit disposed in proximity to said inductor for generating a current signal indicative of the magnitude of current flowing through said inductor;
a motor control circuit connected to said accelerator control and said DC machine for supplying electric power to said DC machine proportional to said acceleration signal when said motor control circuit is connected to said vehicle battery;
a first controllable switch for controllably either connecting said motor control circuit to said vehicle battery or disconnecting said motor control circuit from said battery;
a second controllable switch for controllably either connecting said armature coil of said DC machine in series with said inductor or disconnecting said armature coil of said DC machine from said inductor;

a third controllable switch connected in shunt with said inductor for controllably either connecting a short circuit across said inductor or disconnecting said short circuit from said inductor;

a control demand circuit connected to said accelerator control and said brake control for generating a control demand signal proportional to the difference between said acceleration signal and said brake signal;

a field coil current driver circuit connected to said control demand circuit and said field coil of said DC machine for supplying current to said field coil corresponding to the magnitude and sign of said control demand signal; and a control circuit connected to said vehicle speed sensor, said accelerator control, said brake control, said first, second and third controllable switches, and said current sensor circuit for controlling said first controllable switch to disconnect said motor control circuit from said battery, said second controllable switch to connect said armature coil of said DC machine in series with said inductor, and said third controllable switch to disconnect said short circuit from said inductor when either (1) said control demand signal indicates a desired net acceleration demand and said current signal indicates the presence of a nonzero current through said inductor, or (2) said control demand signal indicates a net braking demand, said vehicle speed signal indicates a vehicle speed greater than zero and said current signal indicates an inductor current less than a predetermined amount, for controlling said first controllable switch to disconnect said motor control circuit from said vehicle battery, said second controllable switch to disconnect said armature coil of said DC machine from said inductor, and said third controllable switch to connect said short circuit across said inductor when either (1) said control demand signal indicates a net braking demand, said vehicle speed signal indicates a vehicle speed greater than zero and said current signal indicates an inductor current greater than or equal to said predetermined amount, (2) said control demand signal indicates a net braking demand and said vehicle speed signal indicates a vehicle speed equal to zero, or (3) said control demand signal indicates a zero net demand, and for controlling said first controllable switch to connect said motor control circuit to said vehicle battery, said second controllable switch to disconnect said armature coil of said DC machine from said inductor, and said third controllable switch to disconnect said short circuit across said inductor when said control demand signal indicates a net acceleration demand and said current signal indicates zero current through said inductor.

9. The vehicle propulsion system as claimed in claim 8, further comprising:

a mechanical brake coupled for stopping motion of the vehicle; and a brake control circuit connected to said mechanical brake for actuating said mechanical brake when either (1) said control demand signal indicates a net braking demand and said vehicle speed signal indicates a vehicle speed of zero, or (2) said control demand signal indicates a net braking demand, said vehicle speed signal indicates a nonzero vehicle speed and said current signal indicates an inductor current greater than or equal to said predetermined amount.

10. The vehicle propulsion system as claimed in claim 9, wherein:

said inductor is generally operated under superconducting conditions; and said predetermined amount is the maximum current through said inductor preserving superconducting conditions.

* * * * *